Sept. 23, 1952     E. SCHUTZ     2,611,398
WOOD SAWING AND CUTTING MACHINE

Filed Dec. 14, 1948     2 SHEETS—SHEET 1

INVENTOR
EWALD SCHUTZ
BY
ATTORNEYS

Sept. 23, 1952  E. SCHUTZ  2,611,398
WOOD SAWING AND CUTTING MACHINE
Filed Dec. 14, 1948  2 SHEETS—SHEET 2

INVENTOR
EWALD SCHUTZ
BY
Ramey, Chisholm + Hildes
ATTORNEYS

Patented Sept. 23, 1952

2,611,398

UNITED STATES PATENT OFFICE 2,611,398

WOOD SAWING AND CUTTING MACHINE

Ewald Schutz, Lancaster, Pa., assignor, by mesne assignments, to De Walt Inc., Lancaster, Pa., a corporation of Pennsylvania Application December 14, 1948, Serial No. 65,207

4 Claims. (Cl. 143—6)

This invention relates to woodworking machines in which a power-driven circular saw is mounted on the free end of a horizontal arm and is manually reciprocated to effect the cut.

In certain sawing machines for woodworking, the saw is so mounted that it can be reciprocated readily over a worktable on which is placed the lumber to be cut. This is a usual procedure in the cross cutting of lumber. For ripping, the saw is generally rotated on a vertical axis through an angle of 90° and locked in position, and the lumber fed into the saw.

One way of mounting the saw assembly for use in cross cutting is to attach it to a carriage which can travel back and forth along a stationary horizontal arm projecting forwardly above the worktable. This has the advantage that the operator has a lighter load to reciprocate as he moves the saw back and forth, and, in addition, there is less problem in obtaining a rigid arm. However, the front end of the arm is more or less in the way of the operator.

Another way of providing for movement of the saw assembly is by providing a reciprocable horizontal arm projecting forwardly over the worktable and mounting the saw assembly at the forward end of the arm. The arm and saw assembly are then reciprocated as a unit, and thus the arm is moved rearwardly out of the way of the operator when the saw is moved rearwardly over the worktable. This arrangement necessarily requires a rigid and comparatively frictionless supporting of the arm due to the tendency of the arm to sag under the heavy overhanging weight, particularly when the saw assembly is in extreme forward position.

In addition, the mounting must be such as to prevent twisting, sidesway or chattering of the arm and saw assembly, particularly when heavy or extremely hard or knotty lumber is being cut. Also, the mounting must be simple and long-wearing and the arm shaped to possess the necessary rigidity, together with the characteristics of ease of production and light weight. In the present invention, the construction is of the latter type, in that the tool-carrying arm is reciprocably mounted in its support. The construction here shown is in some respects an improvement over that shown in my Patent 2,353,088, issued July 4, 1944.

General objects of the present invention are to provide for a woodworking machine having a reciprocable tool-carrying arm, an arm mounting support or bearing head which is rigid, affords easy reciprocation of the arm, and maintains accurate straight-line movement of the arm over a long period of time without objectionable twisting or sidesway.

Another object of the invention is to provide for power-driven woodworking machines an improved reciprocable arm structure which is very rigid, inexpensive, easily produced, reliable and rugged, and to provide an improved clamp for holding the arm against reciprocation during ripping operations.

Another object is to generally improve woodworking machines of the type described.

Further objects and objects relating to construction, manufacture and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
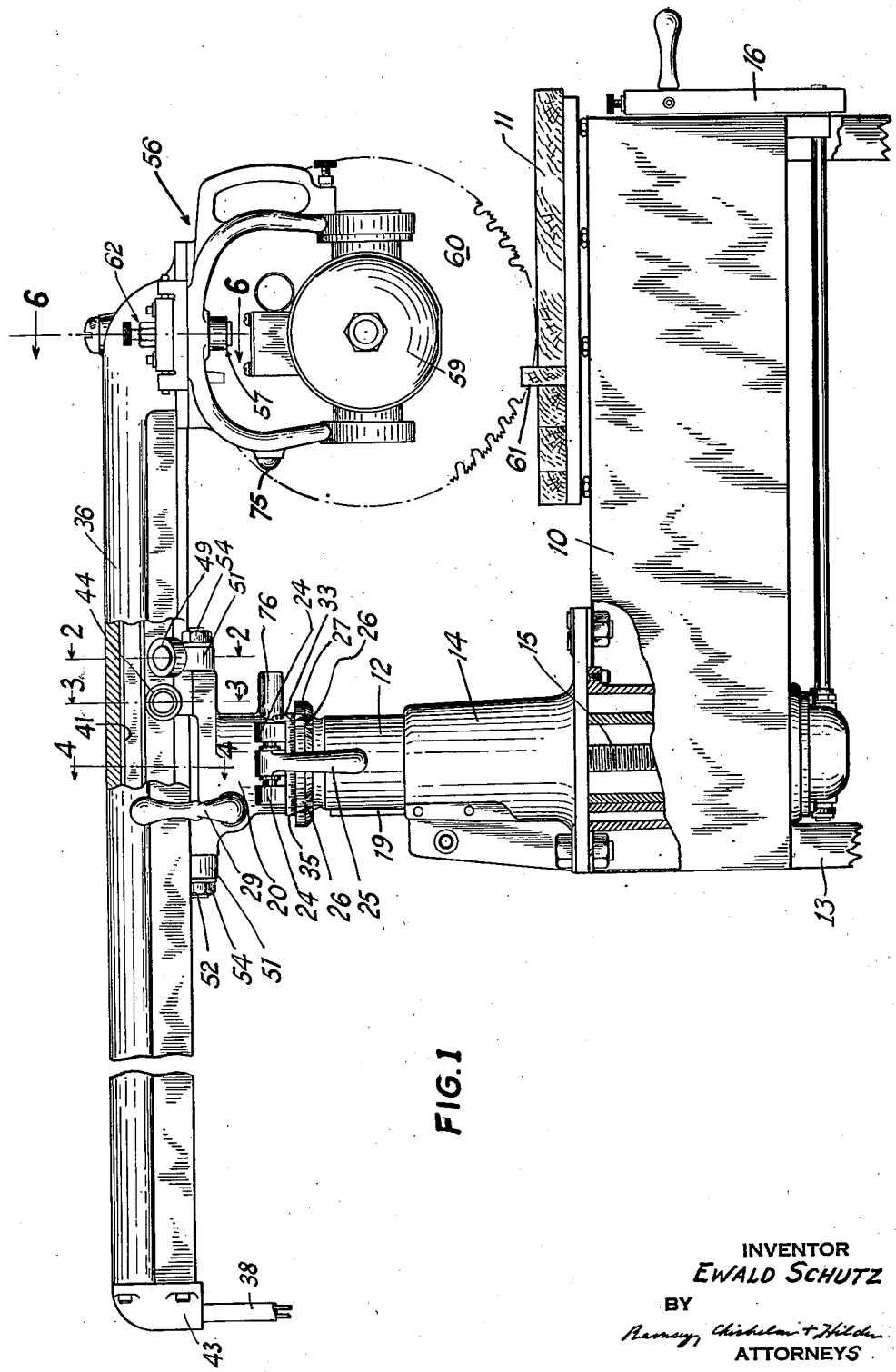
Fig. 1 is a side elevation of the sawing machine, portions of the machine being broken away for convenience of illustration.

Referring in detail to the drawings, the machine of the present invention includes a rectangular table-like frame 10 which supports certain portions of the sawing machine in fixed relation. Legs 13 at the four corners of the frame 10 support it at a convenient height. A horizontal worktable 11 is mounted on the forward portion of the frame 10 and serves to support and guide lumber to be cut or otherwise operated upon by the machine.

A vertical supporting column 12 is located at the rear portion of the frame 10. This column is mounted within a guide sleeve 14 mounted on the frame 10 and may be raised and lowered by means of an elevating screw 15. A crank 16 is located at the forward side of the frame 10 for operating the elevating screw through a gear assembly 17 located underneath the column 12. The column 12 is free to be moved vertically within limits by the elevating screw 15 but is held against rotation by a spline 19 secured to and extending lengthwise of the column and received within a complementary groove formed within the guide sleeve 14.

Figure 4:
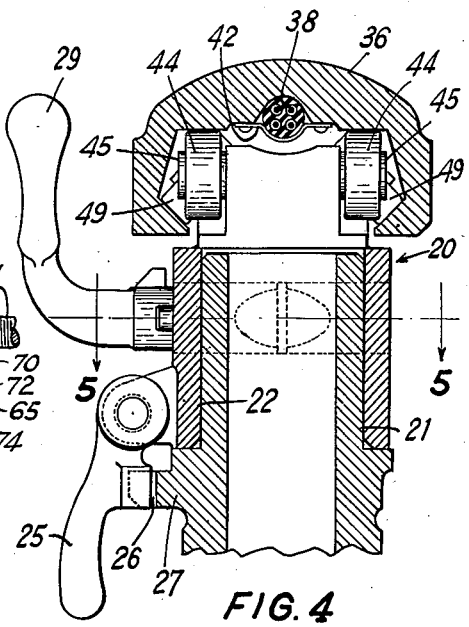
Fig. 4 is a vertical section, on a reduced scale, through the horizontal arm, bearing head and top portion of the supporting column taken on the line 4, 4 of Fig. 1.

A bearing head 20 is supported for rotation in a horizontal plane about the axis of the column 12 by a stepped portion 21 formed in the top of the column and received within a central bore 22 of the bearing head (Fig. 4). The bearing head 20 is provided with a pair of spaced, laterally-extending ears 24, 24 pivotally mounting a lever 25 therebetween. The lever 25 is urged by gravity to a position extending downwardly beside column 12 and a portion of the lever is normally engaged within one of a plurality of notches 26 formed in a collar 27 extending outwardly around a portion of the circumference adjacent the top of the column. The notches 26 are so formed as to locate the bearing head 20 at fixed commonly used horizontal angles so as to similarly determine the path of reciprocation of the sawing machine across the worktable 11, as will be explained. Preferably, these notches are located at 45° intervals.

Figure 5:
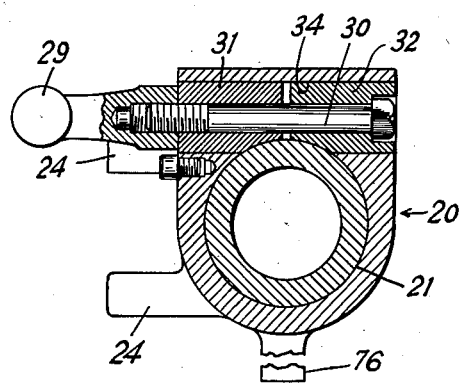
Fig. 5 is a horizontal section through the supporting column and bearing head, taken on the line 5, 5 of Fig. 4.

A clamp is provided for at times securing the bearing head 20 against rotation on the column 12, this clamp consisting of a clamping lever 29 threadedly engaged with a bolt 30. The lever 29 and bolt 30 serves to clamp two reciprocable elements 31 and 32 received in a bore 34 within the bearing head and intersecting the bore 22, tightly against the surface of portion 21 of the column (Fig. 5). This clamp is normally loose and the bearing head 20 held against rotation by the lever 25. However, if it is desired to make cuts at angles other than those provided by the notches 26, the lever 25 may be swung out of engagement with the collar 27 and the bearing head freely rotated to the desired angle indicated by a scale 35 mounted on the column 12 and an indicator 33 mounted on the bearing head 20, and the clamping lever 29 tightened to retain the bearing head in set position on the column.

A horizontal saw assembly supporting arm 36 is provided, riding over the top of column 12 and being carried by the bearing head 20. This arm may comprise a rigid metal casting having the cross section indicated in Figs. 2, 3 and 4 extending throughout its length except for the forward end. This cross section is in general an inverted channel having inwardly-turned lateral edges 37, 37. Each of the edges 37, 37 is provided with a planar bearing track 39 extending along the inner surface of the edge for substantially the entire length of the arm 36. The bearing tracks 39, 39 are upwardly divergent at equal angles.

A second pair of spaced bearing tracks 40, 40 are provided along the inner surface of the base of the channel-shaped arm 36, these tracks being coplanar, generally opposite the bearing tracks 39, 39 and also extending for substantially the entire length of the arm. The bearing tracks 39, 39 and 40, 40 are each accurately machined to a plane surface and do not converge or diverge along the length of the arm. The arm may also be provided with a groove 41 extending along the inner surface of the arm between the bearing tracks 40, 40 for receiving an electric cable 38 for supplying power to the saw assembly to be described. This cable may be held in place within the groove 41 by clips 42 projecting thereacross at intervals. The cable 38 may be entered into the rear end of the arm 36 through a member 43 secured thereto and limiting the forward motion of the arm.

Figure 3:
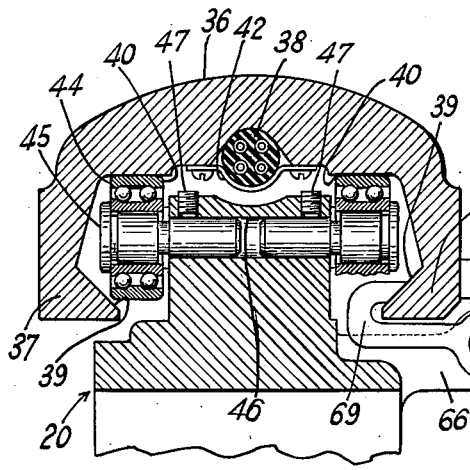
Fig. 3 is a vertical section through the horizontal arm and bearing head taken on the line 3, 3 of Fig. 1.

Four pairs of rollers are provided for reciprocably mounting the arm 36 on the bearing head 20. These rollers are symmetrically mounted on the body of the bearing head 20 with respect to the central bore 22 thereof and form a portion of the bearing head. Two pairs of rollers 44 are mounted on horizontal axes 45 received within bores 46 within the bearing head 20 (Fig. 3). These axes may be held in place by means of set screws 47. Each of the rollers 44 may comprise a stock size of roller bearing, the inner race being carried by the axis and the outer race rolling along the cooperating bearing track. The rollers 44 are adapted to roll, two along each of the bearing tracks 40, 40 the rollers being suitably spaced for this function and serving to carry downwardly-directed load from the arm 36.

Figure 2:
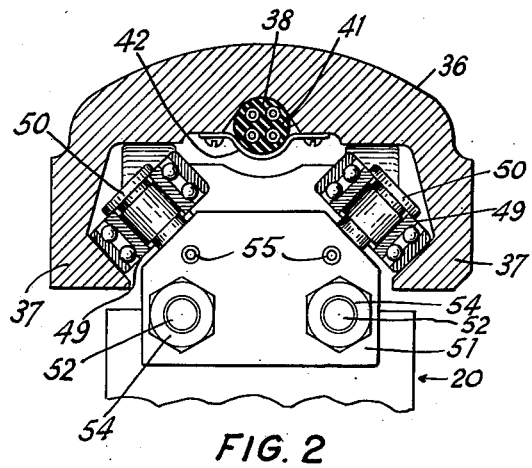
Fig. 2 is a vertical section of the horizontal arm taken on the line 2, 2 of Fig. 1, portions of the bearing head being shown in elevation and portions being shown in vertical section.

Two pairs of rollers 49 are also mounted on the bearing head 20 symmetrically of its central bore 22 and supported on two pairs of upwardly-diverging axes 50 (Fig. 2). The axes 50 are retained within bores formed in end members 51, 51, one mounted on each end of the body of the bearing head 20 and forming a portion thereof. Each of the members 51, 51 may be secured to the body of the bearing head 20 by a pair of horizontally-projecting studs 52, 52 and nuts 54, 54. Set screws 55 serve to retain the axes 50 within their bores.

The angle of the axes 50 of the rollers 49 corresponds with the angle of the bearing tracks 39, 39 and the rollers 49 are adapted to roll along these bearing tracks, the rollers taking upward or lateral load from the arm resulting from operation of the machine or reciprocation of the arm 36 toward forward position so as to produce a large overhanging load on the arm.

A saw assembly 56 is mounted on the forward end of arm 36 for rotation on a vertical axis by a bolt and nut 57 to set the saw assembly for ripping operations. The saw assembly 56 includes an electric motor 59 and a circular saw disc or blade 60. The saw disc 60 is maintained parallel to the arm 36 for cross cuts and miter cuts, the arm 36 being reciprocated lengthwise and riding over the bearing head 20. For ripping or cutting lengthwise of pieces, the saw disc 60 is set perpendicular to the arm 36, the arm is clamped against reciprocatory movement and the lumber is fed into the saw disc, being guided by a raised strip or guide 61 on the worktable 11.

Figure 6:
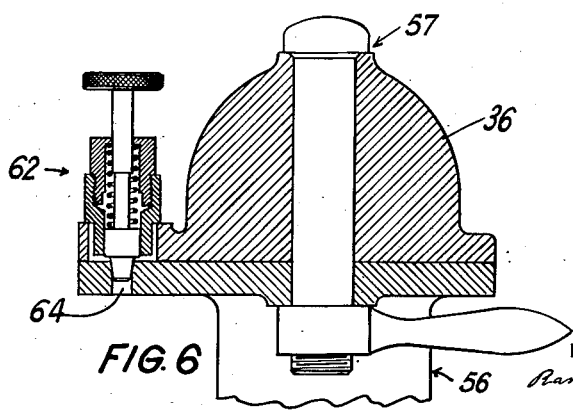
Fig. 6 is a vertical section through the horizontal arm and saw assembly mount, taken on the line 6, 6 of Fig. 1.

To lock the saw assembly in desired position on the arm 36, a spring latch 62 is provided on the arm which may be engaged with detents 64 formed in an adjacent portion of the saw assembly (see Fig. 6). This locking arrangement is similar to the one shown and described in Gardner et al. Patent 2,289,259.

A resilient rubber hemispherical bumper 75 may be provided on the saw assembly 56 for engaging a forwardly-projecting stop 76 located on the bearing head 20 for limiting the rearward movement of the arm 36 and the saw assembly.

A clamp 65 (Fig. 3) is mounted on one side of the bearing head 20 for clamping the arm 36 against movement on the bearing head during ripping operations. The clamp 65 is supported between a pair of ears 66 (one shown) projecting laterally on one side of the bearing head 20 midway between the rollers 44, 44. The clamp 65 has a U-shaped portion 69 projecting along the outside of one of the inturned edges 37 of the arm 36 and within the interior of the arm, having an end portion cut at an angle corresponding with the angle of the adjacent bearing track 39. An exterior portion 70 of the clamp 65 extends upwardly outside the arm 36 and is provided with a threaded aperture receiving a thumb screw 71. The clamp 65 is provided with an enlarged mounting hole 72 loosely receiving a transverse bolt 74 extending between the two ears 66 and giving a floating or limiting adjustive movement to the clamp. The arrangement is such that upon tightening the screw against the arm 36, the position of the floating clamp may shift so that the U-shaped portion 69 of the clamp also tightly engages the bottom edge of the arm and the bearing track 39, thus firmly engaging the arm. Likewise upon loosening of the screw the U-shaped portion will move out of engagement with the track to allow free movement of the arm. The two ears 66 prevent sidewise displacing of the clamp 65, thus resulting in a rigid clamping of the arm against reciprocatory movement.

I claim:

1. In a woodworking machine having a work-supporting table, a vertical supporting column, a bearing head mounted on the top of the column, a horizontal arm riding over the bearing head and projecting forwardly above the table and a saw assembly including an electric power motor mounted on the forward end of the arm, the improvement which comprises: the arm being formed of an inverted channel section having inturned lateral edges provided on the inner surfaces with upwardly-diverging planar tracks, having a pair of spaced coplanar tracks extending along the inner surface of the top thereof and generally opposite the upwardly-diverging tracks; the bearing head comprising a body supporting two pairs of rollers mounted on horizontal axes for engaging the coplanar tracks and carrying downwardly-directed load, and supporting two pairs of rollers mounted on upwardly-diverging axes for engaging the upwardly-diverging tracks and carrying upward and lateral loads a groove extending along said inner surface between the co-planar bearing tracks or substantially the length of the arm and receiving an electric cable for supplying power to the electric motor of said saw assembly whereby said electric cable may be safely secured and prevented from interfering with or being damaged by said co-acting rollers and bearing tracks, and a clamp floatingly mounted on said bearing head for engaging and locking said arm for ripping, said clamp constructed and arranged to shift upwardly on one of said upwardly-diverging tracks of said arm when in clamping position and to move downwardly and away from said arm when in non-clamping position.

2. In a woodworking machine having a work-supporting table, a vertical supporting column, a bearing head mounted on the top of the column, a horizontal arm riding over the bearing head and projecting forwardly above the table, and a saw assembly mounted on the forward end of the arm, the improvement which comprises: the arm being formed of an inverted channel section having inturned lateral edges provided on their inner surfaces with upwardly-diverging planar bearing tracks and having a pair of spaced coplanar bearing tracks extending along the inner surface of the top thereof and generally opposite the upwardly-diverging tracks; and the bearing head comprising a body supporting two pairs of rollers mounted on horizontal axes for engaging the coplanar tracks and carrying downwardly-directed load, supporting two pairs of rollers mounted on upwardly-diverging axes for engaging the upwardly-diverging tracks and carrying upward and lateral loads, and a pivoted clamp loosely mounted on the bearing head for locking the arm for ripping, the clamp having at one end a U-shaped portion adapted to engage the bottom edge of the channel section and one of the upwardly-diverging bearing tracks and at its other end a thumb screw for engaging the side of the channel section, said loosely engaged pivot located substantially intermediate said end portions so that upon tightening said thumb screw said U-shaped portion will tightly engage said upwardly diverging bearing track.

3. In a woodworking machine having a work-supporting table, a vertical supporting column, a bearing head mounted on the top of the column, a horizontal arm riding over the bearing head and projecting forwardly above the table and a saw assembly mounted on the forward end of the arm, the improvement which comprises: the arm being formed of an inverted channel section having inturned lateral edges provided on their inner surfaces with upwardly-diverging planar bearing tracks and having a pair of spaced coplanar bearing tracks extending along the inner surface of the top thereof and generally opposite the upwardly-diverging tracks; and the bearing head comprising a body supporting two pairs of rollers mounted on horizontal axes for engaging the coplanar tracks and carrying downwardly directed load, supporting two pairs of rollers mounted on upwardly-diverging axes for engaging the upwardly-diverging tracks and carrying upward and lateral loads, and a clamp mounted on the bearing head and having a U-shaped portion adapted to engage the bottom edge of the channel section and one of the upwardly-diverging bearing tracks and a thumb screw for engaging the side of the channel section, the clamp having a floating mounting on the bearing head to permit displacement of the clamp into and out of firm engagement with the arm.

4. In a woodworking machine having a work-supporting table, a vertical supporting column, a bearing head mounted on the top of the column, a horizontal arm riding over the bearing head and projecting forwardly above the table and a saw assembly mounted on the forward end of the arm, the improvement which comprises: the arm being formed of an inverted channel section having inturned lateral edges provided on their inner surfaces with upwardly-diverging planar bearing tracks; and the bearing head comprising a body supporting two pairs of rollers mounted on upwardly-diverging axes for engaging the upwardly-diverging tracks and carrying upward and lateral loads, a pivoted clamp mounted on the bearing head and having a U-shaped portion adapted to engage the bottom edge of the channel section and one of the upwardly-diverging bearing tracks and a thumb screw for engaging the side of the channel section, the clamp having a floating mounting on the bearing head to permit displacement of the clamp into and out of firm engagement with the arm.

EWALD SCHUTZ.

REFERENCES CITED

The following references are of record in the file of this patent:

UNITED STATES PATENTS

| Number | Name | Date |
|---|---|---|
| 1,660,386 | Klausmeyer | Feb. 28, 1928 |
| 1,748,446 | Gatzsch | Feb. 25, 1930 |
| 1,805,043 | Horton | May 12, 1931 |
| 1,867,275 | McCarter | July 12, 1932 |
| 2,173,587 | Huffman | Sept. 19, 1939 |
| 2,185,304 | Knapp | Jan. 2, 1940 |
| 2,289,259 | Gardner et al. | July 7, 1942 |
| 2,312,356 | Ocenasek | Mar. 2, 1943 |
| 2,329,357 | Mowery et al. | Sept. 14, 1943 |
| 2,353,088 | Schutz | July 4, 1944 |
| 2,356,610 | Penney | Aug. 23, 1944 |